United States Patent [19]

Wagli et al.

[11] Patent Number: 4,734,575

[45] Date of Patent: Mar. 29, 1988

[54] LIGHT BARRIER UTILIZING TWO RADIATION BRANCHES EACH HAVING DIFFERENTLY POLARIZED FILTERS

[75] Inventors: Peter Wagli, Jona-wangem; Kurt Muller, Stafa, both of Switzerland

[73] Assignee: Cerberus AG, Mannendorf, Switzerland

[21] Appl. No.: 856,834

[22] Filed: Apr. 28, 1986

[30] Foreign Application Priority Data

Apr. 30, 1985 [CH] Switzerland ........................ 1825/85

[51] Int. Cl.[4] ............................................ G01V 9/04

[52] U.S. Cl. .................................... 250/221; 340/555; 250/225

[58] Field of Search ................ 250/221, 225; 340/555, 340/556, 557, 573

[56] References Cited

U.S. PATENT DOCUMENTS

| | | | |
|---|---|---|---|
| 2,457,502 | 12/1948 | Shepherd . | |
| 3,440,427 | 4/1969 | Kammer . | |
| 4,171,908 | 10/1979 | Robert et al. | 250/225 |
| 4,333,008 | 7/1982 | Misek | 250/225 |
| 4,339,660 | 8/1982 | Buchholz et al. | 250/221 |
| 4,342,987 | 8/1982 | Rossin . | |

FOREIGN PATENT DOCUMENTS 1214981 12/1970 United Kingdom .

*Primary Examiner*—David C. Nelms
*Assistant Examiner*—Jessica L. Ruoff
*Attorney, Agent, or Firm*—Brumbaugh, Graves, Donohue & Raymond

[57] ABSTRACT

In a light barrier, especially for outside application and long distances monitored, insensitivity to interfering light and scattering through fumes or fog and an increased range and sensitivity to objects passing through the light barrier are achieved by subdividing radiation from a source into two radiation branches which are offset relative to each other and differently polarized, e.g., by means of a polarization filter divided into two parts, with different linear or oppositely circular polarization of the filter part surfaces. By means of an analogously subdivided polarization filter, the radiation of each of the two radiation branches is focused on a different individual sensor element. The two sensor elements are connected in a differential circuit which triggers an alarm signal in response to signals arriving from both radiation branches in short succession but does not trigger an alarm signal if both sensor elements are equally irradiated.

10 Claims, 6 Drawing Figures

LIGHT BARRIER UTILIZING TWO RADIATION BRANCHES EACH HAVING DIFFERENTLY POLARIZED FILTERS

BACKGROUND OF THE INVENTION

The present invention relates a light barrier system with a radiation source and a radiation sensor, acted on by the radiation of said source and having at least two sensor elements, and including means for polarizing the radiation differently in two branches, and different polarization radiation filters in front of the two sensor elements for detecting the intensity of radiation in the two respective branches, and wherein the two sensor elements are connected in a gating circuit which emits a signal on different irradiation intensities being received by the two sensor elements.

Light barriers are known, e.g., from DE No. 1,934,321 or DE No. 2,014,107 and serve preferably to protect against intrusion. As soon as radiation, (which is preferably in the infrared or visible spectral region), emitted by a radiation source and directed towards a radiation sensor, is interrupted, e.g., by the body of an intruder or by being covered during an attempt at sabotage, a gating circuit releases an alarm signal.

The polarization of the radiation emitted by the radiation source and the arrangement of an equivalent polarizing filter in front of one of the sensor elements, (such that the other sensor element receives radiation which is not or is differently polarized), results in the gating circuit not emitting an output signal when some other radiation, e.g., solar radiation or diffused light, impinges upon the radiation sensor, the polarization of which is different from that of the light barrier radiation. Alternatively the said other radiation may not be polarized, in which event both sensor elements are acted on equally.

Light barriers of this kind, if properly designed, may also be utilized for outside application during daylight hours. For such use the discrimination against interference can be improved by employing alternating radiation of a defined frequency and by tuning the frequency of the gating circuit to synchronize with that of the radiation source as is known in the art. To provide synchronization, the radiation source is typically connected with the radiation sensor or the gating circuit, with the radiation source and radiation sensors located proximate to each other and a reflector is located at a distance from the source and sensors to reflect radiation from the source back to the sensors. However, a reflector is very sensitive to soiling and misalignment, so that the range of such a light barrier, i.e., the safely controllable length of the distance monitored, is therefore rather limited.

Light barriers for outside applications with a larger range, extending from about 10 meters to more than 100 meters, however, are influenced by the weather since fog and rain drops cause radiation scatter, so that when weather conditions are unfavorable, a noticeable weakening of the radiation received will occur, particularly when the path of the radiation between radiation source and radiation sensor is large. In order to prevent the release of a faulty alarm signal in such a case, the sensitivity of the gating circuit must be reduced correspondingly. Moreover in case of a weather-conditioned enlargement of the monitoring beam resulting from radiation scatter, the weakening of the radiation becomes smaller as a result of an object, e.g., an intruder, so that at unfavorable weather conditions, an intruder can no longer be recognized since sufficient scattered radiation still impinges upon the sensor.

SUMMARY OF THE INVENTION

An object of the present invention is to overcome the aforeindicated shortcomings of the prior art, and in particular, to provide a light barrier which even when used outdoors and in the presence of external light as well as scattered radiation due to weather conditions, is able to detect accurately at extended ranges, with improved protection from interference of an object to be detected, e.g., an intruder.

In accordance with the present invention, the aforesaid objectives are achieved by utilizing two radiation branches which are spatially offset relative to each other and having different polarizations which are independent of each other, and by directing the radiation from the two respective radiation branches with different polarizations towards separate respective sensor elements.

Different and independent polarization in the two radiation branches may be obtained by means of suitable polarization filters in front of the radiation source which are linearly polarized, perpendicularly or orthogonally relative to each other. Advantageously, the polarization planes may be selected inclined by an angle of 45° relative to the horizontal or vertical so that elliptically polarized external light with vertical and horizontal main axes, e.g., sunlight, is rendered ineffective because at an inclination of 45° such light acts equally on both sensor elements. Likewise, a circular polarization with opposite senses of rotation may be employed advantageously. In such a case, a corresponding polarization filter combination in front of the radiation sensor is to be provided in each case which, possibly in collaboration with suitable optical elements, guides the polarized radiation from one radiation branch to one sensor element and the radiation from the other radiation branch to the other sensor element. By making use of such a polarization filter combination ahead of the radiation sensor it becomes possible to separate radiation with different polarizations from each other even if both radiation branches overlap in part, whereby an even larger range may be attained.

The invention as well as suitable and advantageous further refinements thereof are explained in detail with reference to the examples of embodiments represented in the figures.

DESCRIPTION OF THE PREFERRED EMBODIMENTS

Figure 1:
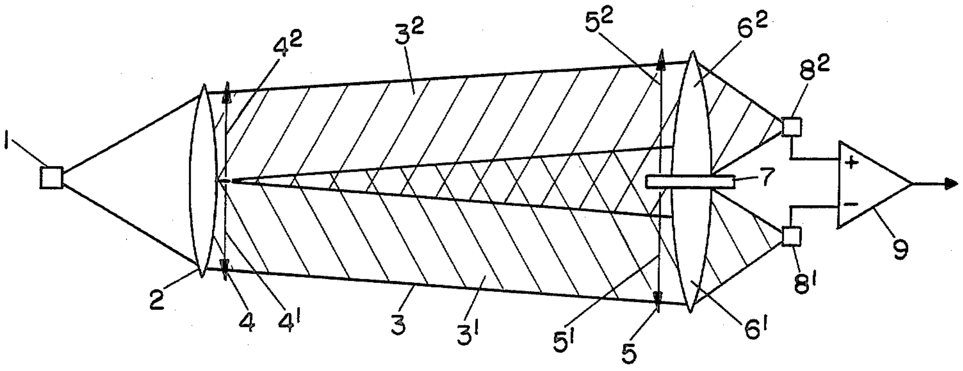
FIG. 1 shows a first embodiment of a light barrier according to the invention.

With reference to the light barrier system represented in FIG. 1, a radiation source 1, e.g., a commercially available light-emitting diode (LED) emits radiation, e.g., infrared or luminous radiation, preferably infrared with approximately 0.9 μm wavelength, which by means of a lens 2 is rendered into a beam in the direction of the monitored section 3. Following the lens 2 is arranged a polarization filter 4 which by means of a preferably vertical dividing plane is divided into two halves with different polarizations. The polarizations in the two halves are mutually exclusive from each other, i.e., the radiation of one polarization type is extinguished by the other half of the filter, and vice versa. By means of this divided polarization filter, the radiation in the monitored section 3 is divided into two radiation branches $\mathbf{3}^1$ and $\mathbf{3}^2$ with correspondingly different polarizations. In the example shown in which a simple focusing lens 2 is employed, the two radiation beams overlap only partly and are arranged side-by-side, preferably side-by-side horizontally.

The radiation from the two radiation branches $\mathbf{3}^1$ and $\mathbf{3}^2$ advances via a further polarization filter 5, divided into two halves and corresponding to the type of polarization of the first filter 4, and two half-lenses $\mathbf{6}^1$ and $\mathbf{6}^2$ which are separated by a diaphragm 7 and have the same plane of division as the polarization filter 5, towards sensor elements $\mathbf{8}^1$ and $\mathbf{8}^2$, respectively, of a dual radiation sensor 8 whose spectral sensitivity corresponds to the radiation source 1, where it is focused.

Even though the two radiation branches $\mathbf{3}^1$ and $\mathbf{3}^2$ intersect or overlap to some extent in the center region, the radiation sensor element $\mathbf{8}^1$ receives exclusively radiation from the branch $\mathbf{3}^1$ which was passed through the polarization filter part $\mathbf{4}^1$ because the share which was delivered by the other half $\mathbf{4}^2$ is absorbed by the polarization filter part $\mathbf{5}^1$. Similarly, the sensor element $\mathbf{8}^2$ receives exclusively radiation from the filter part $\mathbf{4}^2$ of the radiation branch $\mathbf{3}^2$. In this manner a clean separation of the two radiation branches is obtained, even if only relatively simple and low-cost optical elements are employed, so that in an especially simple manner an especially large useful range of the light barrier can be attained without the interfering effect of the unavoidable divergence of the radiation branches. It is evident, however, that in place of simple focusing lenses, more structurally complex lens systems with better precision may be employed, by which the two radiation branches can be maintained with even better separation from each other, whereby the range of the light barrier and its usability under unfavorable weather conditions may be further improved.

The two sensor elements $\mathbf{8}^1$ and $\mathbf{8}^2$ are connected with a gating circuit 9 which is designed, e.g., in form of a differential circuit and delivers a signal corresponding to the difference in radiation received by the two elements. Through non-polarized or differently polarized external radiation, e.g., sunlight or daylight, both sensor elements are acted on by radiation in an equal manner and the gating circuit 9 does not deliver a signal, i.e., external radiation of this kind is automatically eliminated. If radiation-scattering fog appears within the monitored section 3, the irradiation of both sensor elements $\mathbf{8}^1$, $\mathbf{8}^2$ is likewise influenced in the same manner, so that again no difference occurs and the differential circuit 9 does not transmit a signal. Thus, the device can be operated even under unfavorable conditions, i.e., in the presence of external radiation, in fog or rain, over a very large range or length of distance monitored, with undiminished or even improved sensitivity, without the light barrier becoming insensitive or delivering a false signal.

However, a true intruder will cross the two radiation branches $\mathbf{3}^1$, $\mathbf{3}^2$, spatially offset relative to each other, one after the other and thereby generate a difference signal, i.e., the intruder will trigger an alarm signal in any case with considerable safety. The safety of detection and the selectivity pertaining to an intruder can thereby be further improved in that the gating circuit is rendered such that the signals delivered by the two sensor elements $\mathbf{8}^1$ and $\mathbf{8}^2$ must occur with a defined time differential relative to each other, e.g., within a predetermined time window and with a defined intensity, or with other suitable criteria, in order to be able to trigger an alarm. By means of a suitably designed circuit further information may be obtained from the signals e.g., regarding the size and the speed of the detected object.

Figure 2:
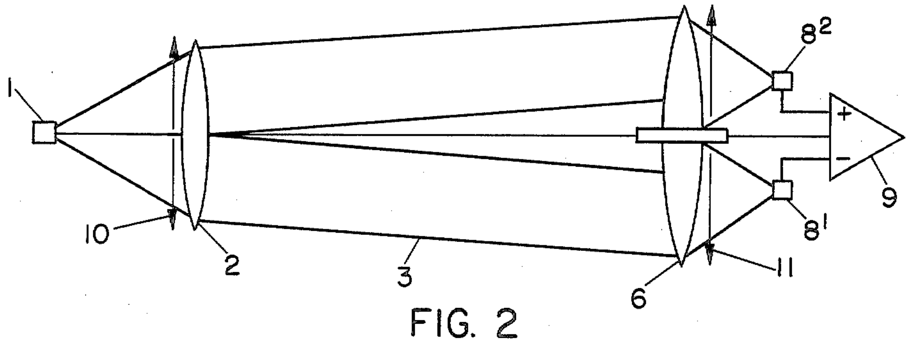
FIG. 2 shows a second form of embodiment of a light barrier according to the invention.

Turning now to the embodiment represented in FIG. 2, whereby identical elements are provided with the same reference numerals as for the aforedescribed light barrier in FIG. 1, a first polarization (transmitter-side) filter 10, divided into halves, is arranged between the radiation source 1 and the lens 2 and an additional polarization (receiver-side) filter 11 between the half-lenses $\mathbf{6}^1$, $\mathbf{6}^2$ and the radiation sensor 8.

Instead, the polarization filters may also be applied directly to the surfaces, i.e., the front side or the back side, of the lens 2 and, respectively, of the half-lenses $\mathbf{6}^1$ and $\mathbf{6}^2$. It is also possible to fashion the lens 2 from differently polarized components of polarizing material or to constitute this lens with zones of different polarization, whereby in each case the receiver-side lenses are constructed and arranged analogously to the transmitter-side lenses.

Further variants are possible, too, within the framework of the invention. In place of arranging the radiation branches horizontally side-by-side, they may also be provided in a different manner. For example, the branches may be constituted as a center portion and a ring surrounding same concentrically while the radiation sensor is constituted correspondingly by a radiation-sensitive circular center zone and a second radiation-sensitive ring shaped zone surrounding the circular center zone. Accordingly, orientation thereof need no longer be paid attention to during assembly.

Figure 3:
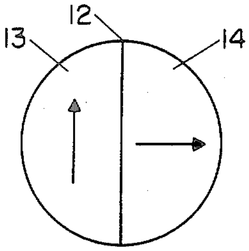
FIG. 3 shows polarization filters with linear polarization.

FIG. 3 shows a polarization filter 4 or 5 and, respectively, 10 or 11 which through a vertical separating line 12 is sub-divided into two halves 13 and 14 with different polarizations. The polarization is linear in both halves, namely, in one half, 13, in the vertical and in the other half, 14, orthogonally thereto, in the horizontal direction. Thus, the two polarizations are mutually exclusive of each other, i.e., radiations polarized in this manner extinguish each other mutually.

Figure 4:
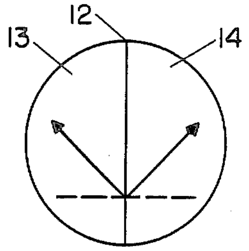
FIG. 4 shows polarization filters with linear polarization, the polarization planes thereof being inclined by an angle of 45° relative to the horizontal plane.

In case of the polarization filter represented in FIG. 4, linear polarization is likewise provided for. However, the two polarization directions in the halves 13 and 14 are inclined by approximately 45° relative to the horizontal or vertical. Since natural external radiations, e.g., sun radiation or sky light, are almost always predominantly vertically or horizontally polarized, if at all, their influence on the two sensor elements sensitized only for 45°-polarized radiation is equal and is eliminated by the gating circuit.

Figure 5:
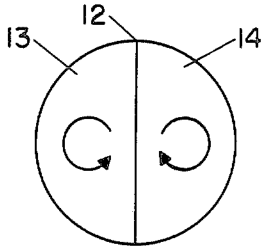
FIG. 5 shows polarization filters with circular polarization in opposite directions.

In the embodiment of a polarization filter shown in FIG. 5, the two halves 13 and 14 are not rendered with linear, but are instead rendered with circular polarization. The two halves have opposite directions of rotation, i.e., the part 13 is rendered circularly polarizing counterclockwise and the part 14 clockwise. Accordingly, too, external radiations can be largely eliminated or rendered ineffective.

As already mentioned, the separating line 12 of the two halves 13 and 14 of the polarization filters 4 and 5 need not necessarily extend vertically. However, the division should ensure that radiation branches are formed which are passed through by an intruder one after the other with a defined measurable time difference.

Figure 6:
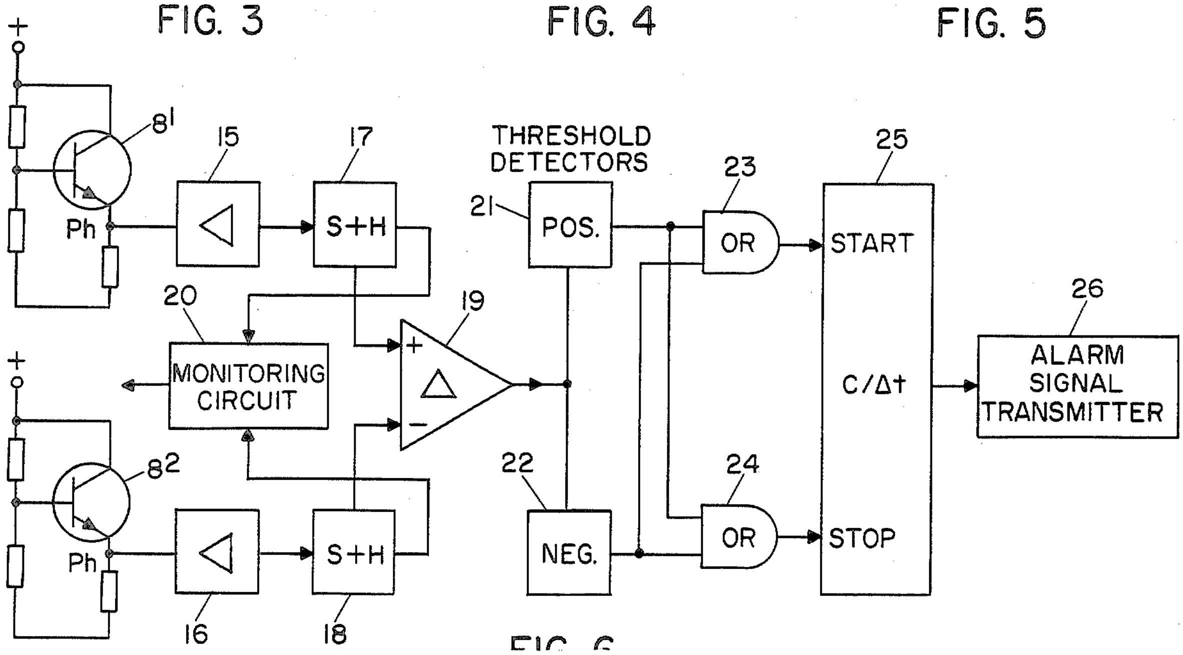
FIG. 6 is an electrical diagram of a gating circuit.

FIG. 6 illustrates an example of a suitable gating circuit whereby the two sensor elements $8^1$ and $8^2$ are rendered in form of phototransistors —Ph— which with associated resistors are connected in an emitter follower circuit and by way of respective preamplifiers 15 and 16, respectively deliver their output signal to respective sample-and-hold circuits 17 and 18. Inasmuch as the radiation source, for reasons of protection from interference, is operated preferably as a pulse radiator with a defined pulse frequency and the preamplifiers are designed to be co respondingly frequency-selective, the two sample-and-hold circuits 17 and 18 store the pulse maxima for a short time and deliver them to a differential circuit 19. On the other hand, they deliver a signal to a monitoring circuit 20 when input pulses do not appear or their magnitude drops below a given threshold, thus indicating interference or a sabotage attempt.

The positive input of the differential circuit 19 is actuated by one sensor element $8^1$, and the negative input by the other sensor element $8^2$. A positive or negative signal will appear at the output of the differential circuit 19, depending on which sensor element was subjected to radiation. In the event that the two radiation branches are passed through in sequence by an object, a positive pulse and a negative pulse will sequentially appear within a short time interval. The output signals of the differential circuit 19 are delivered to both positive and negative threshold value detectors 21, 22, which transmit the signals to two crosswise connected OR-gates, 23, 24 if their intensity exceeds the predefined threshold values. In case a first positive (or negative) pulse appears, the OR-gates 23 and 24 transmit a start pulse to the start input of a counter and time window comparator 25 and the second negative (or positive) pulse to the stop input of the said counter 25.

The counter 25 delivers a signal to an alarm signal transmitter 26 if the second or stop pulse appears within a predefined time window, i.e., if the second pulse arrives after a defined minimum time period but before a predefined maximum time period. The minimum time period may be chosen to be zero, but a finite non-zero minimum time period offers increased safety. After the predefined maximum time period has lapsed, the stop input is blocked and the counter is automatically reset so that the circuit is again ready to operate.

It is evident that other circuits with analogous and equivalent functions may be employed in place of the circuit described. While specific embodiments have been shown and described, it should be understood that numerous variations and modifications may be effected without departing from the true spirit and scope of the invention, which is defined only by the appended claims.

We claim:

1. A light barrier system, comprising:

a source of radiation;

means for producing, from said radiation source, two radiation branches spatially offset from each other in a spatial region to define a light barrier, and including a first polarizer for producing different independent radiation polarization in the two branches;

means for receiving the two radiation branches, comprising a sensor for each radiation branch, and including a second polarizer for filtering the radiation, so that only radiation having the same polarization as the radiation in its associated branch is received by the associated sensor, each of said sensors producing an output signal indicative of the intensity of polarized radiation received; and a gating circuit connected to receive the sensor outputs, and for producing an alarm signal in response to different radiation intensities being received by the two sensors.

2. The light barrier system as set forth in claim 1, wherein the first polarizer is divided into two parts, each part polarizing the radiation in a linear manner to produce polarization planes orthogonal to each other, and wherein the second polarizer is divided into two parts for filtering the radiation in said branches into two polarization planes orthogonal to each other.

3. The light barrier system as set forth in claim 2, wherein the first and second polarizers are arranged with their polarization planes inclined at an angle of about 45° relative to the horizontal plane.

4. The light barrier system as set forth in claim 1, wherein the first polarizer is divided into two parts, wherein one part polarizes the radiation in a circular manner opposite to the other part, and wherein the second polarizer is divided into two parts of different circular polarization corresponding to the direction of circular radiation polarization in their respective branches.

5. The light barrier system as set forth in claim 1, wherein the means for producing two radiation branches produces two radiation branches which overlap only partially.

6. The light barrier system as set forth in claim 1, wherein the means for producing two radiation branches produces two radiation branches which are arranged horizontally side-by-side.

7. The light barrier system as set forth in claim 1, wherein the means for producing two radiation branches produces two radiation branches which are arranged concentrically relative to each other.

8. The light barrier system as set forth in claim 1, wherein the gating circuit comprises a differential circuit which produces a signal having a characteristic dependent on the difference of the output signals of the sensors.

9. The light barrier system according to claim 8, wherein the gating circuit further comprises threshold value circuits which produces a radiation detection signal when the output signal of the differential circuit exceeds or falls below predefined maximum and minimum threshold values.

10. The light barrier system according to claim 8, wherein the gating circuit further comprises a time window comparator which triggers an alarm signal in response to an output signal of sufficient magnitude from one sensor arriving within a predetermined time period of an output signal of sufficient magnitude arriving from the other sensor.

* * * * *